(12) United States Patent
Shi et al.

(10) Patent No.: US 8,634,626 B2
(45) Date of Patent: Jan. 21, 2014

(54) REGISTRATION OF 3D TOMOGRAPHY IMAGES

(75) Inventors: Lin Shi, Hong Kong (CN); Defeng Wang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 183 days.

(21) Appl. No.: 13/135,308

(22) Filed: Jun. 29, 2011

(65) Prior Publication Data

US 2011/0317898 A1 Dec. 29, 2011

Related U.S. Application Data

(60) Provisional application No. 61/398,685, filed on Jun. 29, 2010.

(51) Int. Cl.
*G06K 9/00* (2006.01)
(52) U.S. Cl.
USPC ........................................................ 382/131
(58) Field of Classification Search
None
See application file for complete search history.

(56) References Cited

U.S. PATENT DOCUMENTS

| | | | | |
|---|---|---|---|---|
| 6,704,439 | B1* | 3/2004 | Lee et al. ....................... | 382/131 |
| 8,060,348 | B2* | 11/2011 | Cline et al. ......................... | 703/2 |
| 2002/0007117 | A1* | 1/2002 | Ebadollahi et al. ........... | 600/437 |
| 2006/0115137 | A1* | 6/2006 | Knoplioch et al. ........... | 382/131 |
| 2007/0206844 | A1* | 9/2007 | Russakoff et al. ............ | 382/132 |
| 2009/0034823 | A1* | 2/2009 | Christiansen et al. ........ | 382/133 |
| 2009/0129650 | A1* | 5/2009 | Hawkes et al. ............... | 382/131 |
| 2010/0104154 | A1* | 4/2010 | Chan et al. ..................... | 382/128 |
| 2010/0183211 | A1* | 7/2010 | Meetz et al. .................. | 382/131 |
| 2010/0202685 | A1* | 8/2010 | Naito ............................ | 382/164 |
| 2011/0002523 | A1* | 1/2011 | Prakash et al. ................ | 382/131 |
| 2011/0019890 | A1* | 1/2011 | Oikawa ......................... | 382/131 |
| 2011/0313285 | A1* | 12/2011 | Fallavollita et al. .......... | 600/426 |
| 2012/0075440 | A1* | 3/2012 | Ahuja et al. ..................... | 348/61 |

OTHER PUBLICATIONS

Penney, G. P., Weese, J., Little, J. A., Desmedt, P., Hill, D. L., & Hawkes, D. J. (1998). A comparison of similarity measures for use in 2-D-3-D medical image registration. IEEE Transactions on Medical Imaging, 17(4), 586-595. Springer.*
Ramme, A. J., DeVries, N., Kallemyn, N. A., Magnotta, V. A., & Grosland, N. M. (2009). Semi-automated phalanx bone segmentation using the expectation maximization algorithm. Journal of digital imaging the official journal of the Society for Computer Applications in Radiology, 22(5), 483-491. Springer New York.*
Huesman, R. H., Klein, G. J., Kimdon, J. A., Kuo, C., & Majumdar, S. (2002). Deformable registration of multimodal data including rigid structures. IEEE Transactions on Nuclear Science. Ieee.*
Chen, Y.-T., & Wang, M.-S. (2004). Three-dimensional reconstruction and fusion for multi-modality spinal images. Computerized Medical Imaging and Graphics, 28(1-2), 21-31.*

(Continued)

*Primary Examiner* — Stephen R Koziol
*Assistant Examiner* — Sean Conner
(74) *Attorney, Agent, or Firm* — Seed IP Law Group PLLC (57) ABSTRACT

Disclosed are methods and apparatus for analyzing medical image change, particularly bone changes, either bone gain or loss. Disclosed also are methods and apparatus for bone registration of computed tomography (CT) images. These new methods and apparatus significantly improve the efficiency of current matching procedure.

23 Claims, 5 Drawing Sheets
(5 of 5 Drawing Sheet(s) Filed in Color)

Registration pipeline for HR-pQCT data.

(56) References Cited

OTHER PUBLICATIONS

Black et al., "The Effects of Parathyroid Hormone and Alendronate Alone or in Combination in Postmenopausal Osteoporosis," *The New England Journal of Medicine 349*(13):1207-1215, 2003.

Boutroy et al., "In Vivo Assessment of Trabecular Bone Microarchitecture by High-Resolution Peripheral Quantitative Computed Tomography," *The Journal of Clinical Endocrinology & Metabolism 90*(12):6508-6615, 2005.

Boutroy et al., "Finite Element Analysis Based on In Vivo HR-pQCT Images of the Distal Radius Is Associated With Wrist Fracture in Postmenopausal Women," *Journal of Bone and Mineral Research 23*(3):392-399, 2007.

Boyd et al., Evaluation of Three-dimensional Image Registration Methodologies for In Vivo Micro-computed Tomography, *Annals of Biomedical Engineering 34*(10):1587-1599, 2006.

Horn, "Closed-form solution of absolute orientation using unit quaternions," *J. Opt. Soc. Am. A 4*(4):629-642, 1987.

Kanis et al., "Perspective. The Diagnosis of Osteoporosis," *Journal of Bone and Mineral Research 9*(8):1137-1141, 1994.

Kanis et al., "An Update on the Diagnosis and Assessment of Osteoporosis with Densitometry," *Osteoporos. Int.11*:192-202, 2000.

Khosla et al., "Effects of Sex and Age on Bone Microstructure at the Ultradistal Radius: A Population-Based Noninvasive In Vivo Assessment," *Journal of Bone and Mineral Research 21*(1):124-131, 2006.

Li et al., "Identify fracture-critical regions inside the proximal femur using statistical parametric mapping," *Bone 44*:596-602, 2009.

Lloyd, "Least Squares Quantization in PCM," *IEEE Transactions on Information Theory IT-28*(2):129-137, 1982.

Lorensen et al., "Marching Cubes: A High Resolution 3D Surface Contruction Algorithm," *Computer Graphics 21*(4):163-169, 1987.

MacNeil et al., "Improved reproducibility of high-resolution peripheral quantitative computed tomography for measurement of bone quality," *Medical Engineering & Physics 30*:792-799, 2008.

Meijering et al., "Quantitative Comparison of Sinc—Approximating Kernels for Medical Image Interpolation," *MICCAI'99, LNCS 1679*: 210-218, 1999.

Smith et al., "Advances in functional and structural MR image analysis and implementation as FSL," *NeuroImage 23*:S208-S219, 2004.

Sornay-Rendu et al., "Alterations of Cortical and Trabecular Architecture Are Associated With Fractures in Postmenopausal Women, Partially Independent of Decreased BMD Measured by DXA: The OFELY Study," *Journal of Bone and Mineral Research 22*(3): 425-433, 2007.

Vico et al., "High-Resolution pQCT Analysis at the Distal Radius and Tibia Disciminates Patients With Recent Wrist and Femoral Neck Fractures," *Jounral of Bone and Mineral Research 23*(11):1741-1750, 2008.

\* cited by examiner

Fig. 1 Registration pipeline for HR-pQCT data.

Fig. 2 Bony structure segmentation for HR-pQCT images.

Fig. 3 The surface registration between two scans of the same subject.

Fig. 4 The visualization of the registration result on the 2-D images of HR-pQCT.

Fig. 5 The comparison between double clustering and multiple-cluster clustering.

REGISTRATION OF 3D TOMOGRAPHY IMAGES

CROSS REFERENCE OF RELATED APPLICATIONS

This application claims the benefit of U.S. Provisional Patent Application No. 61/398,685, titled "Registration of 3D Tomography Images," filed Jun. 29, 2010, which is incorporated herein by reference in its entirety.

TECHNICAL FIELD

This disclosure relates generally to a method and apparatus for analyzing a medical image, and more particularly to a method and apparatus for analyzing a bone image.

BACKGROUND

Medical images are images of a human subject that are analyzed for the purposes of diagnosing and treating disease, injury and birth defects. While medical images may be captured using conventional photography, more commonly, medical images involve modalities that are able to image the internal structure of the subject in a non-invasive manner. Examples of such modalities include computed tomography (CT), magnetic resonance imaging (MRI), positron emission tomography (PET), ultrasound, fluoroscopy, conventional x-rays, and the like. Medical images may be analog or digital, two-dimensional or three-dimensional; however, three-dimensional modalities are digital.

The term "bone" may be used to refer to various levels of bone structure, composition and organization, from the gross visual, naked eye identification of a specific whole bone or a part of a whole bone such as the femur (the upper bone of the thigh), viz., "bone" as an organ or a part of an organ, to the specific structural organization of portions of a bone by light microscopy, that is, of "bone" as a tissue, e.g., compact bone (cortex or hard shell) or cancellous (spongy or trabecular) bone, or even to the organization of the individual components of bone tissue, that is, "bone" as a substance or material (bone substance) whose individual components can be visualized, for example, by electron microscopy and other techniques.

The basic bone substance or material is composed principally of a soft matrix consisting primarily of the (fibrous) protein collagen and small amounts of other organic constituents and other extracellular, extravascular organic constituents and is referred to as the organic matrix of bone substance. It is into this matrix that the other major component of bone substance, the hard crystals of calcium-phosphate ("apatite") (solid mineral phase), is deposited. Therefore, the two major components of bone substance are: (1) a soft organic matrix (hereinafter also referred to as spongy or trabecular) and (2) the hard solid phase of the calcium-phosphate crystals, the solid mineral phase (hereinafter also referred to as cortex or hard shell). These two components provide a good portion of the mechanical properties of bone as an organ, a tissue and a material substance, as well as many of the physiological functions of bone substance. The organic matrix of bone substance is ordinarily considered to consist of the extracellular, extravascular organic components of the bone substance and the bone tissue, and is chemically analyzed by measuring the collagen or collagen and other known proteins and organic constituents of the extracellular, extravascular matrix.

There are 5 types of bone found within the human body. These are long bones, short bones, flat bones, irregular bones and sesamoid bones.

Long bones are some of the longest bones in the body, such as the Femur, Humerus and Tibia but are also some of the smallest including the Metacarpals, Metatarsals and Phalanges. The classification of a long bone includes having a body which is longer than it is wide, with growth plates (epiphysis) at either end, having a hard outer surface of compact bone and a spongy inner known an cancellous bone containing bone marrow. Both ends of the bone are covered in hyaline cartilage to help protect the bone and aid shock absorbtion.

Short bones are defined as being approximately as wide as they are long and have a primary function of providing support and stability with little movement. Examples of short bones are the Carpals and Tarsals in the wrist and foot. They consist of only a thin layer of compact, hard bone with cancellous bone on the inside along with relatively large amounts of bone marrow.

Flat bones are as they sound, strong, flat plates of bone with the main function of providing protection to the bodies vital organs and being a base for muscular attachment. The classic example of a flat bone is the Scapula (shoulder blade). The Sternum (breast bone), Cranium (skull), Pelvis and Ribs are also classified as flat bones. Anterior and posterior surfaces are formed of compact bone to provide strength for protection with the center consisting of cancellous (spongy) bone and varying amounts of bone marrow. In adults, the highest number of red blood cells are formed in flat bones.

Irregular bones are bones which do not fall into any other category due to their non-uniform shape. Good examples of these are the Vertebrae, Sacrum and Mandible (lower jaw). They primarily consist of cancellous bone, with a thin outer layer of compact bone.

Sesamoid bones are usually short or irregular bones, imbedded in a tendon. The most obvious example of this is the Patella (knee cap) which sits within the Patella or Quadriceps tendon. Other sesamoid bones are the Pisiform (smallest of the Carpals) and the two small bones at the base of the 1st Metatarsal. Sesamoid bones are usually present in a tendon where it passes over a joint which serves to protect the tendon.

Techniques for measuring bone mineral density non-invasively have been developed. Two such techniques are by X-ray and by magnetic resonance imaging (MRI).

Currently, two of the most commonly used techniques to measure bone mineral density are: (1) dual energy x-ray absorptiometry (DXA) and (2) computed tomography (CT). DXA utilizes x-rays of two energies. The mineral and soft tissue each exhibit different x-ray scattering cross sections at each energy level, enabling a map of mineral density to be computed from the scan data. However, because of the variable composition of the soft tissue and its variable depth along the view direction, overlapping bone structure and the inhomogeneity of the 3-D spatial distribution of the trabeculae in cancellous bone, for example, the most commonly analyzed bone tissue using this technique, the 2-D (areal) measurement of bone mineral density may not reflect the true volumetric 3-D bone mineral density. Indeed, serious questions have been raised in the literature about the validity and usefulness of the data obtained by DXA.

Computed tomography (CT) produces an accurate measurement of volumetric, 3-D bone mineral density (grams per cubic centimeter). However, when the x-ray intensity is sufficient to make the CT scan quantitatively accurate (quantitative CT or QCT), the radiation dose to the patient is high, limiting the number of scans permissible for a single patient, thus preventing the use of QCT on women of child bearing age, growing children and patients who may require repeated measurements in order to follow and assess the course of a disease or injury or to assess the efficacy of treatment. Like any x-ray based measurement, CT does not distinguish bone matrix from soft tissue, and CT is susceptible to errors because of the variability of soft tissue composition and depth.

Osteoporosis is characterized by low bone mass or bone mineral density, micro-architectural deterioration of the bone and increased fracture risks [1-2]. High-resolution peripheral quantitative computed tomography (HR-pQCT) (XtremeCT, Scanco Medical AG, Switzerland) is a newly available technology. Compared to the conventional technologies for diagnosis of osteoporosis using dual-energy X-ray absorptiometry (DXA), HR-pQCT not only measures the bone mineral density, but also provides structural parameters on the complex micro-architecture of the bone quantitatively. HR-pQCT has already found wide clinical applications in the evaluation of bone micro-architecture, therapeutic efficacy for treatment of osteoporosis, assessment of bone strength and prediction of fracture risk [3-10]. With the aid of computational technologies, i.e., surface extraction and three-dimensional (3-D) rendering, technicians are able to inspect both the cortex (the hard shell) and the trabecular (the spongy of bone) compartments of bone. In addition, the low radiation dosage (<5 µSv) of HR-pQCT warrants its safety in clinical applications [3].

For clinical applications, it is important to be able to accurately analyze bone changes in both density and structure, and longitudinally assess the bone quality, in particular the morphometric analysis of the bone micro-architecture in aging and under the influence of both pharmaceutical and non-pharmaceutical interventions. Therefore, an image analysis procedure with proper alignment of the bony structures in the volumetric data of the baseline and follow-up scans of HR-pQCT is crucial. The evaluation software embedded in the HR-pQCT scanner is able to provide detailed bone morphometric data [11] but the comparison among different scans is limited in the following aspects. The bone contours were identified using the semi-automatic slice-by-slice delineation, which is an inefficient and labor-intensive process. The common region was determined in the scanner as the slices with the same bone area between the two scans. Although the long cast provides support for the arm or leg and prevents the limb from being tilted, care needs to be taken in reposition of the limb in the same way into the cast, which is a manual process with limited precision. In fact, the follow-up scan is inevitably tilted to some extent compared to the baseline, and the anatomical meanings of the cross-sectional slices are not exactly identical. Consequently, the measurement of common region in that case will not be entirely reliable. Instead, if the pose difference between the two volumetric datasets could be explicitly determined, the problem of intra-subject image alignment will be solved. This is one of problems to be solved in this disclosure.

There exist several image registration software programs, such as Statistical Parametric Mapping (SPM) [12], FMRIB Software Library (FSL) [13], and Image Registration Toolkit [14]. In these software programs, the strategy is to apply registration on the overall image homogeneously without differentiating various tissue types. However, in the HR-pQCT images, the deformable non-skeletal structures such as muscles and soft tissues, and the rigid bony structures, should be treated differently. Besides, complexity in trabecular bone geometry and the large size of the HR-pQCT data also poses great challenges on the design of a clinically feasible registration algorithm. A comprehensive survey of existing approaches to the registration of micro-CT images can be found in [20], which compared three similarity measures used for image registration on a rat model. These image-based registration methods treat the bony and non-bone regions equally, so that the registration accuracy of bones was not optimal.

A tailor-made solution for accurate and efficient HR-pQCT volume registration is of special significance as it will allow flexible and comprehensive morphometric comparison in the longitudinal bone health studies being conducted in applicants' center and as reference for many other centers using HR-pQCT for clinical applications. In this disclosure, we propose a novel method to align the baseline and follow-up scans of the same subject with accuracy and efficiency. This method is featured in that no user interaction is needed throughout the whole process.

SUMMARY

It has been recognized herein that it would be advantageous to provide a method or an apparatus for explicitly determining the pose difference between two volumetric datasets of a baseline and a follow-up anatomic scans so as to accurately analyze changes in both density and structure of the anatomic scans.

According to a first aspect disclosed herein, there is provided a method of bone registration of computed tomography (CT) images, comprising acquiring data of a baseline CT scan and a follow-up CT scan of a bone in an individual to produce a baseline image and a follow-up image, segmenting a bony structure of the image via an approach that can determine thresholds for separating the bony structure from background and non-skeletal tissues, and registering a bone surface of the follow-up image with a bone surface in the baseline image using a 3D registration algorithm, whereby an overlap of the follow-up bone surface and the baseline bone surface is better than that before the registration, preferably, the follow-up bone surface and the baseline bone surface is aligned.

According to a second aspect disclosed herein, there is provided a method of a morphometric comparison in a longitudinal assessment of bone quality such bone micro-architecture in a same individual, comprising acquiring data of a baseline scan and a follow-up scan of a bone in the individual to produce a baseline image and a follow-up image, segmenting a bony structure of the image via an approach that can determine thresholds for separating the bony structure from background and non-skeletal tissues, and registering a bone surface of the follow-up image with a bone surface in the baseline image using a 3D registration algorithm so that the follow-up bone surface and the baseline bone surface are aligned, and transforming of the follow-up image and additional follow-up images comprising applying a transformation matrix, which is yielded from the registration, on the data of the follow-up images, whereby the follow-up images can be compared with the coordinate baseline images to determine morphometric difference or change between the baseline images and the follow-up images.

According to a third aspect disclosed herein, there is provided a computed tomography apparatus for a morphometric comparison in a longitudinal assessment of bone quality such bone micro-architecture in a same individual, comprising a) a scanner for scanning a baseline image and a follow-up image a bone in the individual b) a data receptor acquiring data of the baseline image and the follow-up image, if desired additional one or more baseline images and additional one or more follow-up images, c) a segmentation processor for segmenting a bony structure of the image via an approach that can determine thresholds for separating the bony structure from background and non-skeletal tissues, and d) a register for registering a bone surface of the follow-up image with a bone surface in the baseline image using a 3D registration algorithm so that the follow-up bone surface and the baseline bone surface is aligned, and e) a transformation processor for transforming of the follow-up image and the additional follow-up images comprising applying a transformation matrix, which is yielded from the registration and stored in the data receptor, on the data of the follow-up images, and f) an output tool for displaying morphometric difference or change between the baseline images and the follow-up images.

Preferably, the 3D registration algorithm is an iterative closest point (ICP). A transformation to be solved in the ICP involves a limited degree of freedom (DOF). The DOF of the transformation solved is 6 degrees of freedom or is a rigid transformation.

According to an exemplary embodiment of the present disclosure, a time interval between the two scans comprises but is not limited to at least 1, 2, 3, 4, 5, 6, 7, 8, 9, 10, 11, 12 months, 1 year, 1.5 year, and 2 years.

According to a certain exemplary embodiment of the present disclosure, the approach that can determine thresholds for separating the bony structure from background and non-skeletal tissues is a double-clustering approach comprising performing a first K-means clustering on intensities of voxels in the image to separate a foreground from a background, wherein a cluster with higher average intensity is considered to be the foreground, and applying a second K-means clustering on intensities of the voxels in the foreground regions of the image, whereby non-bone structures such as muscles and soft tissues are removed, and a cluster with higher average intensity is determined to be bony regions, and optionally identifying cortical bone from this segmented bone region as a largest connected component in volume data.

In another exemplary embodiment, K=2 in said first K-means clustering and/or K=2 in said second K-means clustering.

Also preferably, the methods disclosed herein further comprises an image down-sampling of the data before the step of bony structure segmentation which may be implemented by specifying shrink factors at each level for each dimension.

Additionally, a registration error between the baseline and follow-up volumetric data decreases after the registration. Preferably, the registration error is quantified as Normalized Total Absolute Intensity Difference (NTAID) and the NTAID value decreases to no more than about 50%, 40%, 30%, 20%, 10%, 5%, 4%, 3%, 2%, or 1% after the registration.

In another exemplary embodiment, the bone is selected from a group consisting of a long bone, a flat bone, a short bone, an irregular bone, and sesamoid bone, preferably a long bone which comprises but not be limited to radius, ulna, humerus, clavicle, femur, tibia, fibula, metatarsals, metacarpals. Preferably, the individual is a mammal, more preferably a human.

In still an exemplary embodiment, said image is of quantitative computed tomography (CT), quantitative CT, pQCT, micro-CT, High-resolution peripheral quantitative computed tomography (HR-pQCT), Magnetic resonance imaging, or PET-CT.

In an exemplary embodiment of the disclosure, the methods as described herein further comprise adopting a windowed sinc interpolation to minimize aliasing artifacts in the transformation. Preferably the window size is set to 3.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects and advantages of the present disclosure will become better understood with regard to the following description and accompanying drawings wherein:

FIG. 2(a): The down-sampled image; FIG. 2(b): The foreground regions segmented from the first clustering; and FIG. 2(c): The bony structures segmented from the second clustering.

FIG. 3(a): The bone surface reconstructed from the baseline scan; FIG. 3(b): The bone surface reconstructed from the follow-up scan; FIG. 3(c): The overlap of the bone surfaces of the baseline and the follow-up scans before registration; and FIG. 3(d): The overlap of the two bone surfaces after registration.

FIG. 4(a): A 2-D slice of the baseline scan; FIG. 4(b): A 2-D slice of the follow-up scan; FIG. 4(c): the overlay of the two scans before registration; FIG. 4(d): the overlay of the baseline scan and the transformed follow-up scan after registration; FIG. 4(e): the difference image of the two scans before registration; and FIG. 4(f): the difference image of the two scans after registration.

FIG. 5(a): a slice of the original HR-pQCT image FIG. 5(b): the clustering result from double clustering FIG. 5(c): the result from the K-means clustering, when K=3 (d~f) the result from the K-means clustering, when K=4.

DETAILED DESCRIPTION

In describing exemplary embodiments of the present disclosure illustrated in the drawings, specific embodiments comprising specific apparatus and medical images are employed for the sake of clarity. However, the present disclosure is not intended to be limited to the specific embodiments so selected, and it is to be understood that each specific element includes all technical equivalents which operate in a similar manner.

For the purpose of this description, a High-resolution peripheral quantitative computed tomography (HR-pQCT) is used to exemplarily demonstrate the methods or the apparatus disclosed herein. Also, a wrist of a human body is scanned by the HR-pQCT as an example of the medical image. However, it can be appreciated that the invention can be used to register or analyze of any bone structure or anatomic structure in a body, more particularly a density of the structure.

A. Data Acquisition

An HR-pQCT scanner can be used to acquire in vivo high resolution images of the wrist at the distal radius and ulna of an individual who can be a healthy volunteer, as well as patients suffering with idiopathic scoliosis or osteoporosis. The time interval between the two scans preferably is at least 6 months. At least 10 slices, preferably at least 50 slices, more preferably 100 slices are scanned. The distal forearm should be precisely positioned during the baseline and the follow-up scanning.

B. Overview

Figure 1:
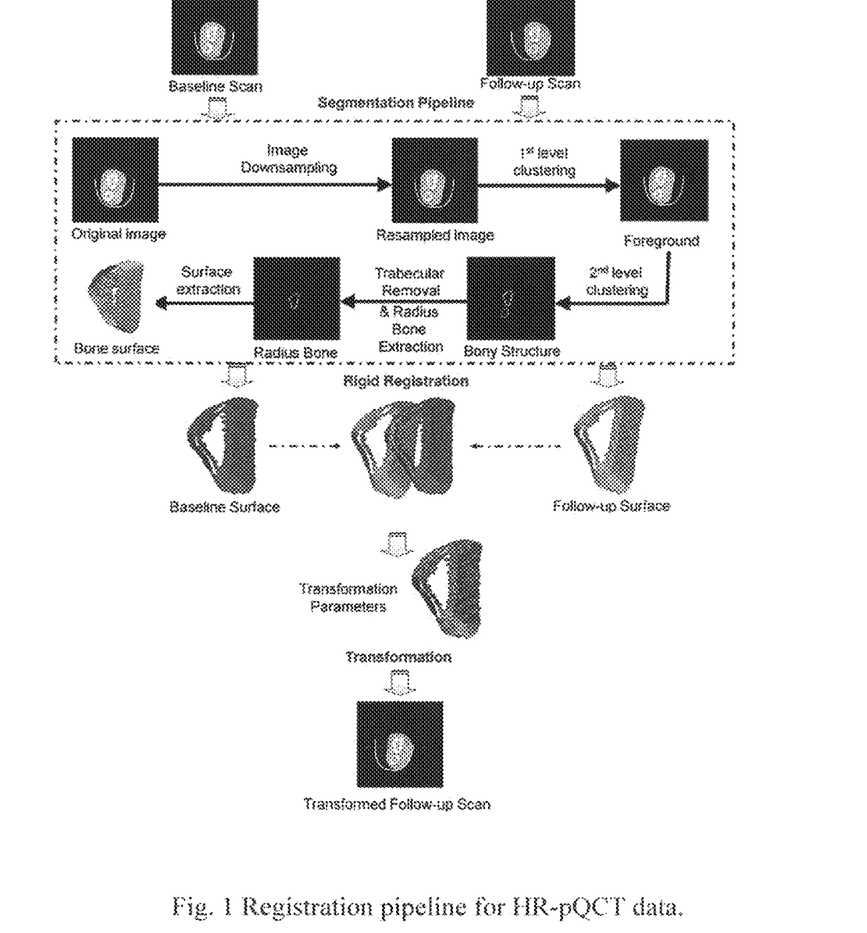
FIG. 1 shows registration pipeline for High-resolution peripheral quantitative computed tomography (HR-pQCT) data: the bony surfaces of the two scans are first extracted, and then the rigid registration of the surfaces is applied. The transformation parameters are finally applied on the follow-up images.

The overview of the proposed methodology is illustrated in FIG. 1. The whole scheme comprises three major steps: bone segmentation, bone surface registration, and the transformation of the gray-scale images of the follow-up scan. The details of each step will be elaborated in the remainder of this section.

C. Image Down-Sampling

The huge size of high-resolution HR-pQCT data poses great computational burden to the segmentation and registration. To make the data manipulation more efficient, the volumetric data was down-sampled along the x-, y-, and z-directions. The image down-sampling can be performed by creating an image pyramid using a multi-level scheme, which is implemented by specifying the shrink factors at each level for each dimension. In an embodiment, two levels of image down-sampling are used: The first level reduced the image by a factor of 5 in the x-direction, 5 in the y-dimension, and 1 in the z-direction. In the second level, the image is further reduced by a factor of 2 in the x-dimension, 2 in the y-dimension, and 2 in the z-direction. The B-spline technique is adopted to create the new volumetric data approximating to the original data with the least squared error but containing less control points.

D. Bony Structure Segmentation

The segmentation of the bony structures in the HR-pQCT data is performed in a fully automatic manner following a novel "double-clustering" approach. This approach adaptively determines the threshold that separates the bony structures. First, a K-means clustering [15] (K=2) is performed on the intensities of the voxels in the second-level down-sampled image to separate the foreground from the background—the cluster with higher average intensity is considered to be the foreground. As the foreground contained not only the high-intensity bony structure but also the medium-intensity soft tissue regions, another K-means clustering (K=2) is applied on the intensities of the voxels in the foreground regions of the first-level down-sampled images. This operation removes the cast, muscles and soft tissues, and the cluster with higher average intensity is determined to be bony regions. The radius bone is used as an example as the region of interest, as it is the interested bone region in most HR-pQCT applications. The cortical bone is further identified from this segmented bone region as the largest connected component in the volume data. Afterwards, the cortical surface of the radius bone is extracted employing the marching cube algorithm [16].

E. Bone Surface Registration

The follow-up surface F is rigidly registered with the baseline surface B using the iterative closest point (ICP) algorithm [17]. This registration determines the transformation that can align the follow-up and the baseline datasets. The transformation to be solved in ICP algorithm involves a limited degree of freedom (DOF). The DOF of the transformation solved herein preferred is a rigid transformation (the DOF is 6 degrees of the freedom) because the two volumetric data are scanned from the same individual, and the transformation between them should be rigid in principle.

A close-form solution to the least-squares problem for aligning points from two coordinates involved in the ICP algorithm has been proposed in [18]. The rotation parameters are the eigenvector associated with the largest positive eigenvalue of the symmetric 4×4 matrix, whose elements are calculated from the coordinates of the corresponding points. As the transformation disclosed herein is rigid, the scaling factor should be 1 in all directions. The translational offset is the difference between the centroid of the coordinates in one system and the rotated centroid of the coordinates in the other system.

F. Transformation of the Follow-up Images

The transformation matrix, i.e., T, yielded from the rigid registration is applied on the volumetric data of the follow-up scan. T is a 4×4 matrix consisting of rotation, translation and scaling.

In order to minimize the aliasing artifacts in the transformation, the windowed sine interpolation [19] is adopted. Based on the theory of Fourier analysis, the continuous signal can be recovered from the discrete sampling by removing the replicated spectra in the frequency domain. In windowed sinc interpolation, the spatial discrete signal is convolved with a sinc function. The sine is truncated by multiplying it with a window function. Larger window size results in more precise interpolation, but requires longer computation time. In this study, the window size was set to 3.

EXAMPLES

Subjects and Device Used in Experiments

HR-pQCT scanner (XtremeCT, Scanco Medical AG., Brüttisellen, Switzerland) was used to acquire in vivo high resolution images of the wrist at the distal radius and ulna of a healthy male volunteer, as well as 10 patients, i.e., five adolescents (age range: 19.0~22.6 years old) with idiopathic scoliosis and five elderly patients with osteoporosis (age rage: 75.5~86.5 years old). The effective radiation dose is <5 µSv per measurement (ICRP91), which was developed for in vivo human applications [21, 22]. The time interval between the two scans was 7±1 months. 110 slices were scanned with an image resolution of 82 µm nominal isotropic, and image matrix of 1536×1536. The distal forearm was precisely positioned during the baseline and the follow-up scanning by the same technician Computational Configuration and Execution Time On the test HR-pQCT data from the volunteers, used was a PC with a Pentium IV processor, 3.0 GHz CPU and 3.0 GB RAM. The CPU time for executing the image down-sampling was 25 s. The bony structure segmentation spent 13 s, and 8 s was used for extraction of each bony surface using marching cube. The rigid surface registration using ICP algorithm spent 12 s. The transformation of the follow-up images was 85 s. Thus, a total of 143 s was required for executing the HR-pQCT registration methods disclosed herein. From the bone surface of the baseline scan, 210,247 points were uniformly sampled; on the follow-up bone surface, 160,447 points were uniformly sampled.

The image down-sampling, image segmentation, surface extraction, surface registration, and the image transformation were implemented in C++ using the Insight Segmentation and Registration Toolkit (ITK) classes (www.itk.org). The Visualization Toolkit (VTK) (www.vtk.org) was utilized to visualize the surface extraction and registration results.

Experimental Results

Figure 2:
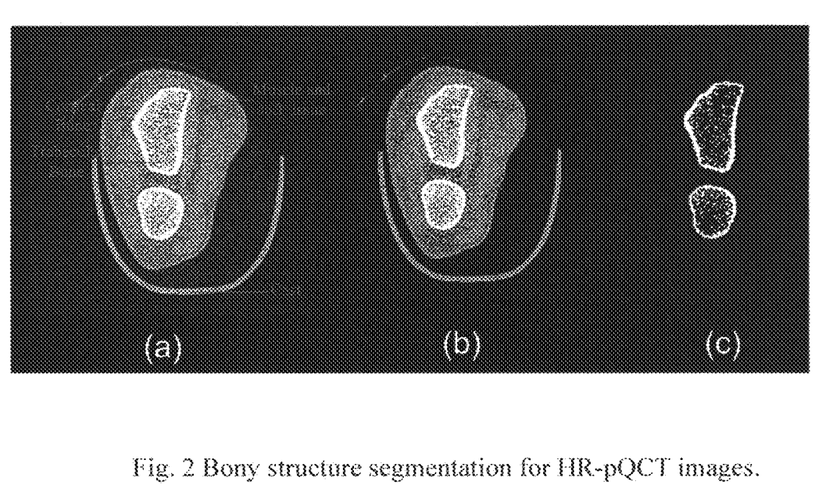
FIG. 2 shows bony structure segmentation for HR-pQCT images.

The methods disclosed herein were evaluated on the HR-pQCT data. The intermediate and final results of the double-clustering segmentation on the healthy volunteer are shown in FIG. 2. A 2-D cross-sectional slice of the wrist HR-pQCT volume after the first level down-sampling is shown in FIG. 2(a). From the inner to the outer side of the image, as indicated in FIG. 2(a), there were trabecular and cortical bones (with high image intensities), the non-bony structures (with the medium image intensities) including the muscle and soft tissues, and the cast used to hold the volunteer's arm (the light "ribbon" beneath the wrist). It can also be observed that the background air contained random noises. FIG. 2(b) showed the segmentation result after the first clustering: foreground objects, including the wrist and the cast, have been well-separated from the background. FIG. 2(c) illustrated the bone regions segmented using the second clustering. The crisply separated bone from the non-bony tissues/cast showed the effectiveness of using double-clustering for HR-pQCT data segmentation.

Figure 3:
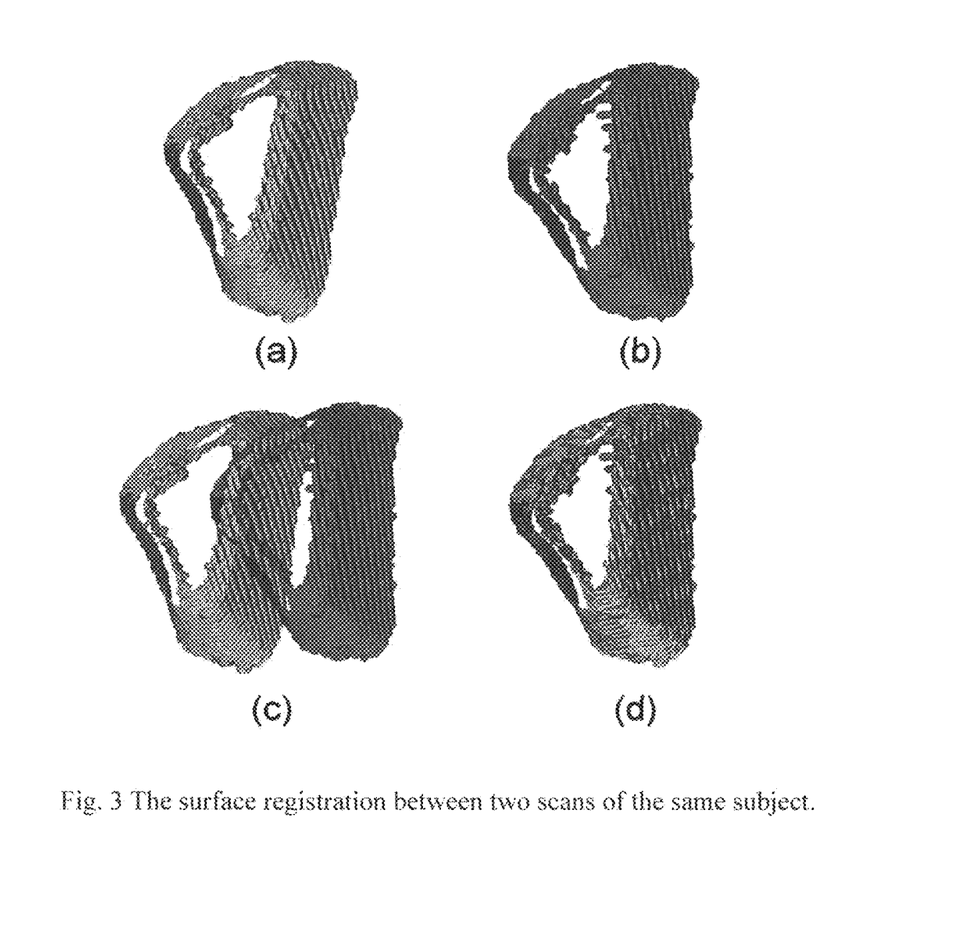
FIG. 3 shows the surface registration between two scans of the same subject.

FIGS. 3(a) and 3(b) visualized the baseline and follow-up radius bone surfaces of the healthy volunteer in their own coordinate systems. Before registration, there was apparent pose difference between the two surfaces in a common coordinate system, as shown in FIG. 3(c). After the rigid registration, the two surfaces were well aligned, which can be reflected by the zigzag effect (cf. FIG. 3(d)).

Figure 4:
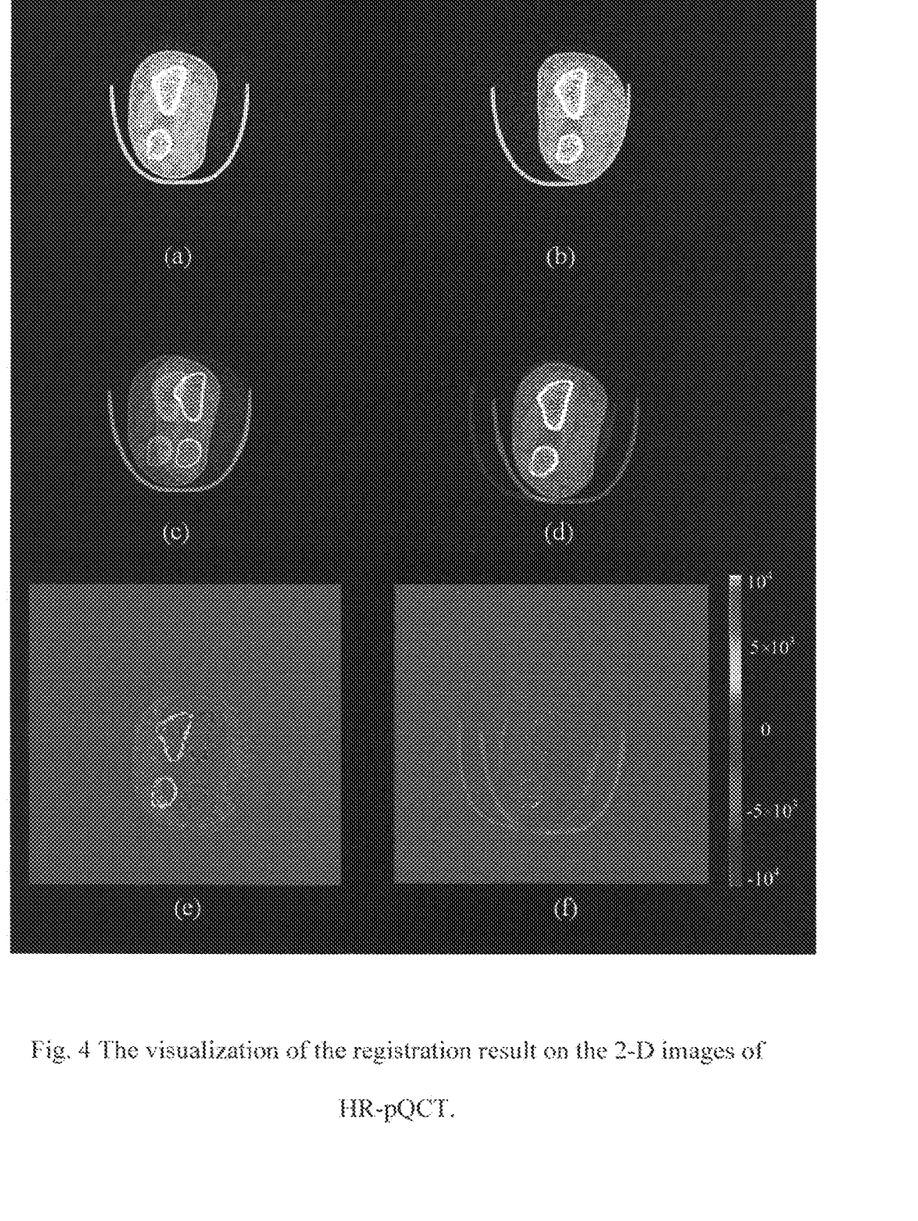
FIG. 4 shows the visualization of the registration result on the 2-D images of HR-pQCT.

The transformation matrix with 6 DOF derived from the rigid body registration was then applied on the follow-up images as has been described in Section "F. Transformation of the Follow-up Images". The result of the registration on the healthy volunteer can be observed from FIG. 4. One slice of the original baseline images and the corresponding follow-up image were shown in FIGS. 4(a) and 4(b). These two original images are superimposed, and the distance between the bony structures can be clearly observed in FIG. 4(c). After transformation, the pose of bony structure in the follow-up image is much closer to that of the baseline image, as can be seen from FIG. 4(d). The difference images between these two slices before registration and after registration can be seen in FIGS. 4(e) and 4(f), respectively.

To evaluate the quality of the bony structure segmentation, two operators performed visual scoring (range 0-10) by observing the segmented regions superimposed on the original image for all the 11 datasets. Consistently highest score (i.e., 10) has been achieved in every observation of each operator.

The registration error between the baseline and follow-up volumetric data was quantified as the Normalized Total Absolute Intensity Difference (NTAID), i.e., Equation 1, $$NTAID = \frac{\sum_{i=1}^{N}|I_B^{bone}(i) - I_F^{bone}(i)|}{\sum_{i=1}^{N}I_B^{bone}(i) + \sum_{i=1}^{N}I_F^{bone}(i)} \times 100\%, \quad (1)$$

where $I_B^{bone}(i)$ and $I_F^{bone}(I)$ are the image intensities of the $i^{th}$ voxel in the cortical bone regions of baseline and follow-up data respectively. N is the number of voxels in each dataset, which was 1536×1536×110 in our experiment. Before registration, the NTAID value between the bony structures in the 3-D baseline and follow-up images for the healthy volunteer was 82.53%. After registration, this NTAID value decreased to 2.4%. On the 5 adolescents with idiopathic scoliosis, the NTAID values after registration were 2.6%±0.7%. On the 5 elderly osteoporosis patients, the NTAID values after registration were 3.7%±0.8%.

DISCUSSION AND CONCLUSION

Compared with the image matching software provided by scanner's workstation (i.e., Scanco's XtremeCT in the author's study), the image matching methods of the present disclosure are advantageous in the following aspects. First, the methods relieve the operator's workload as the bone contour can be the extracted automatically. Current bone matching provided by the scanner is based on the bone area matching, in which the bone contour is identified using a semi-automatic slice-by-slice delineation on the volumetric dataset consisting of up to hundreds of slices, which is inefficient and labor-intensive. This semi-automatic bone labeling process essentially is an image segmentation process, which is realized in the methods disclosed herein by fully automatic double-clustering. Second, 3D registration theoretically is more reliable than 2D area matching, as the former is able to resolve the inconsistency in the 2D slices over time caused by "tilting" of the bone. Third, the 3D registered follow-up scan can be compared with the baseline scan voxel-by-voxel. In comparison, the 2D matching in the current scanner's workstation can only tell which slice in the follow-up scan is corresponding to which slice in the baseline scan, while the images are not aligned spatially, so that reliability of voxel-wise comparison (such as that performed in [24]) is not guaranteed.

The efficiency of the disclosed methods is achieved in the following ways. First, the high-resolution data is largely reduced via two-level image down-sampling. Moreover, the registration is performed on the cortical bone surfaces, instead of the gray-scale images, thus the number of data points involved in the computation is significantly reduced, and registration error caused by tilting of the limb can be avoided. In addition, the ICP algorithm itself converges within a small number of iterations, and the optimization problem for each iteration in the ICP algorithm has a close-form solution that makes the surface registration very fast. Moreover, the image segmentation is achieved using double-clustering, which is based on the simple and fast K-means (K=2) algorithm.

Figure 5:
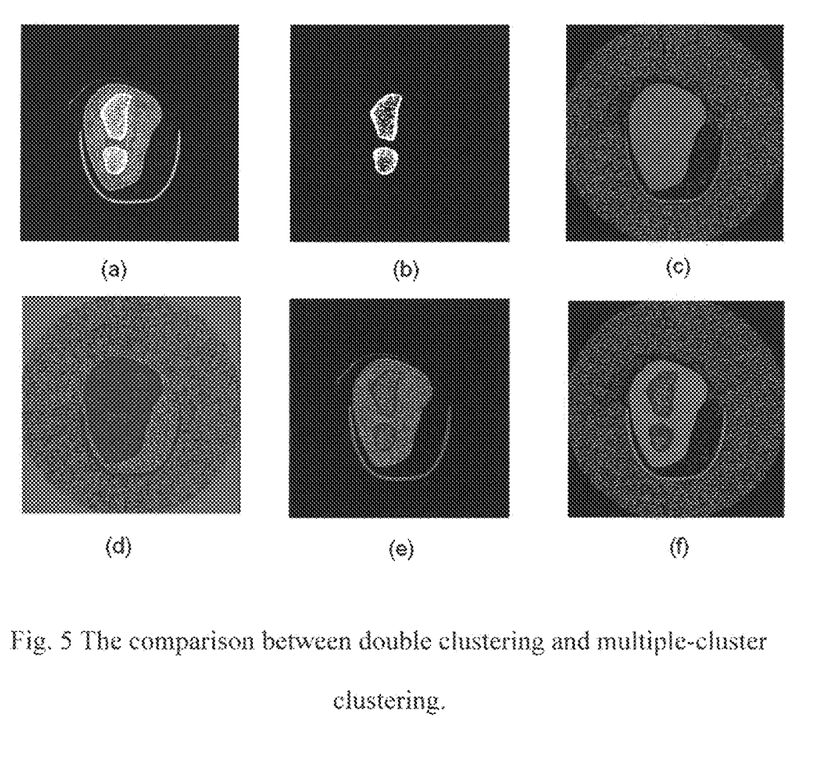
FIG. 5 shows the comparison between double clustering and multiple-cluster clustering.

Empirically, double K-means clustering with K=2 is better than single K-means with K=3 or more. As can be observed in FIG. 5, if multiple-cluster K-means clustering (e.g. K=3) was applied, noises in the background would form a separate cluster, and the bone cannot be differentiated from the muscle and soft tissue. When K was set to 4, as can be seen in FIGS. 5(d)-5(f), the result is very unstable. This phenomenon was induced by the nature of K-means clustering algorithm, in which the initial cluster centers were randomly selected, and the solution of the optimization problem tended to converge to the local minimum. Due to the large number of voxels in the background, it was very likely that one cluster center was selected on the background, and thus a cluster with noises in the background was formed. Apart from that, this computationally simple double K-means clustering was chosen instead of the kernel clustering methods, such as the kernel K-means and spectral clustering, because of the consideration of computational efficiency.

The percentage change of structural and density parameters in the follow-up and baseline scans matched using the methods disclosed herein and the Scanco's method are reported in Table 1. The meanings of the abbreviations of those parameters are listed in Table 2. In general, the change in these parameter values showed no significant difference between the registration method disclosed herein and the Scanco's method. In fact, this comparison result is expected as the scanner's software requires labeling of the bone boundary by the operator before the measurements are performed. Though it is hard to say which matching method is superior as the ground truth is not known, it can be inferred from the "common region" in Table 1 that the method disclosed herein tends to improve the value of common region in poor bone quality, i.e., the osteoporosis patients, while the method did not deteriorate the common region value in good bone condition, i.e., the AIS patients, who are not supposed to suffer from significant bone changes over time. In fact, the most noteworthy advantages of the methods disclosed herein lie in its automaticity, the ability to correct bone tilting, and the applicability to enable voxel-wise comparison.

The impact of image transformation on the morphological parameters is quantified in this invention to ensure there is no significant error introduced in the rigid transformation using the following procedure. The follow-up scan (namely $V_F$) was first transformed to match the baseline scan by applying the transformation matrix (T), and then recovered to $V_F'$ by applying the inverse of the transformation matrix (i.e., $T^{-1}$). It turned out that all the changes in terms of the scanner's parameters were in the range of 0.0%~0.2%, and the common region between $V_F$ and $V_F'$ was 100%.

NTAID measures the voxel-wise difference in the intensity exclusively in cortical bone regions—the larger this value is, the poorer the alignment would be. The experiment of the registration performed on the images of one healthy volunteer yielded the reduction of NTAID value from 82.53% (poor alignment) to 2.4% (good alignment), which illustrated the effectiveness of the registration method disclosed herein. Of course, it would be more desirable if there are fiducial markers as reference so that Fiducial Registration Error (FRE) and Target Registration Error (TRE) could be applied similar to [20], but apparently adding fiducial markers is not practical for in vivo examination of human.

The common region of the bony structure between the two scans can be straightforwardly derived as the intersection between bony structures in the two image sets after registration. The numeric value of the common region (CR) can be defined as in Equation 2, $$CR = \frac{2 \times |M_B^{bone} \cap M_F^{bone}|}{|M_B^{bone}| + |M_F^{bone}|} \times 100\%, \quad (2)$$

where $M_B^{bone}$ and $M_F^{bone}$ represent the binary bone mask of the baseline and follow-up scans. The number of voxels in an arbitrary set A is represented as $|A|$. For example, $|M_B^{bone}|$ is the number of voxels in $M_B^{bone}$. After determining the common region, voxel-wise comparison inside the common region is able to comprehensively reflect the bone changes between the two scans.

The registration accuracy in osteoporosis patients being poorer than the AIS group can be explained by the following two reasons: (1) due to the bone loss, the cortical bone is thinner than the non-osteoporosis group. On the other hand, the registration method disclosed herein relies on the sample points extracted on the cortical bone. It can be understood that the registration accuracy, therefore, is influenced somehow by the thinning of the cortical bone; (2) There is bone loss in the second scan compared to the first scan in the osteoporosis group, which is also reflected by the NTAID measure.

In the case of multiple follow-up scans being acquired, the registration method disclosed herein will not cause any extra burden in further data storage, because the final results are the "transformed" and "resliced" 2-D gray-scale images instead of 3-D surface: (1)

The baseline scan remains unchanged; (2) The (1st, 2nd, . . . ) follow-up scans remain their original sizes—only the content of each slice across difference scans varies to have the same anatomical meaning; (3) When a new follow-up scan of the patient is acquired, it only needs to be registered with the baseline scan (within a couple of minutes), and all the previous scans do not need to be re-calculated.

In summary, this invention introduces a new method for automatic intra-subject registration of medical scan data such as the HR-pQCT data. This method is featured in its efficiency and accuracy, which has been demonstrated by the experiment on the real clinical dataset. This method can be used for the comprehensive and flexible HR-pQCT data comparison in the longitudinal assessment of the bone quality, in particular the morphometric analysis of the bone micro-architecture in aging and under the influence of both pharmaceutical and non-pharmaceutical interventions. The method disclosed herein can also be conveniently extended to the alignment of the other high-resolution quantitative CT data collected either in vivo or in vitro, such as pQCT and micro-CT data collected for pre-clinical osteoporosis research.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

All publications and/or patents and/or product descriptions cited in this document are fully incorporated herein by reference to the same extent as if each had been individually incorporated herein by reference.

TABLE 1

Changes of density and structural values between the follow-up and the baseline scans in adolescent idiopathic scoliosis (AIS) patients and the osteoporosis (OS) patients (mean and standard deviation within each group were reported). The Scanco's common-region-based matching method and the registration method as disclosed herein were tested to match the follow-up scan with the baseline scan on the same cohorts of subjects, and the parameter changes in percentage were compared.

|  |  | Change (%) using Scanco's Matching Method | | Change (%) using Registration Method of the present disclosure | |
|---|---|---|---|---|---|
|  |  | AIS (mean ± sd) | OS (mean ± sd) | AIS (mean ± sd) | OS (mean ± sd) |
| Density Parameters (Δ%) | D100 | 1.38 ± 0.52 | 0.13 ± 1.53 | 0.98 ± 0.57 | −1.05 ± 1.44 |
|  | Dtrab | 2.48 ± 0.58 | −2.23 ± 1.94 | 2.42 ± 1.06 | −2.33 ± 1.48 |
|  | Dmeta | 1.32 ± 0.90 | −0.68 ± 2.83 | 1.24 ± 0.88 | −1.73 ± 1.89 |
|  | Dinn | 4.00 ± 2.61 | 7.85 ± 26.84 | 4.32 ± 2.13 | 7.88 ± 15.18 |
|  | Meta/Inn | −2.50 ± 2.03 | 3.20 ± 4.20 | −2.94 ± 1.31 | 2.73 ± 4.49 |
| Structural Parameters (Δ%) | BV/TV | 2.48 ± 1.52 | −2.23 ± 1.92 | 2.42 ± 1.10 | −2.33 ± 1.45 |
|  | Tb.N | 1.46 ± 7.64 | 1.68 ± 13.31 | 1.94 ± 7.67 | 1.68 ± 12.88 |
|  | Tb.Th | 1.38 ± 6.89 | −2.73 ± 10.14 | −0.10 ± 6.92 | −2.80 ± 10.87 |
|  | Tb.Sp | −1.26 ± 7.14 | −0.23 ± 11.70 | −1.74 ± 7.31 | −0.30 ± 11.52 |
|  | Tb.1/N.SD | −0.26 ± 2.30 | −8.93 ± 13.62 | −0.60 ± 3.49 | −4.38 ± 9.32 |
|  | Dcomp | 1.04 ± 0.44 | 0.28 ± 2.71 | 0.54 ± 0.32 | −0.55 ± 2.30 |
|  | Ct.Th | 0.28 ± 1.10 | −1.75 ± 7.49 | 0.12 ± 0.77 | −3.10 ± 8.01 |
|  | Ct.Pm | −0.12 ± 0.48 | −0.005 ± 0.43 | 0.004 ± 0.14 | −0.005 ± 1.12 |
|  | Ct.Ar | 0.16 ± 0.88 | −1.70 ± 6.94 | 0.14 ± 0.91 | −3.00 ± 6.72 |
|  | Tb.Ar | 0.04 ± 0.54 | −0.08 ± 0.45 | 0.04 ± 0.35 | 0.10 ± 0.28 |
| Common Region (%) |  | 99.00 ± 0.00 | 92.00 ± 4.73 | 99.00 ± 0.00 | 94.00 ± 1.50 |

TABLE 2

Meaning of the abbreviations of density and structural parameters in Table 1.

| Abbr. | Meaning | Abbr. | Meaning |
|---|---|---|---|
| D100 | Average Bone Density in mg HA/ccm | Tb.N | Number of Trabeculae in 1/mm |
| Dtrab | Trabecular Bone Density in mg HA/ccm | Tb.Th | Trabecular Thickness in mm |
| Dmeta | Meta Trab. Bone Density in mg HA/ccm | Tb.Sp | Trabecular Separation in mm |
| Dinn | Inner Trab. Bone Density in mg HA/ccm | Tb.1/N.SD | StDev of 1/Tb.N; Inhomogeneity of Network in mm |
| Meta/Inn | Ratio Meta to Inner Density |  |  |
| Dcomp | Compact Bone Density in mg HA/ccm | Ct.Th | Cortical Thickness in mm |
| Ct.Pm | Cortical Periosteal Perimeter in mm | Ct.Ar | Cortical Area in $mm^2$ as segmented in cortex aim |
| BV/TV | Trab. Bone Volume to Tissue Volume |  |  |
|  |  | Tb.Ar | Trabecular Area in $mm^2$ |
|  |  | MetaArea | Outer 40% of Tb.Ar. InnArea: Inner 60% of Tb.Ar |

REFERENCES

All of the following references are incorporated herein in their entirety.

[1] J. Kanis, C. Gluer, "An update on the diagnosis and assessment of osteoporosis with densitometry," *Committee of Scientific Advisors, International Osteoporosis Foundation. Osteoporosis Int*, vol. 11, pp. 192-202, 2000.

[2] J. Kanis, L. Melton, C. Christiansen, C. Johnston, N. Khaltaev, "The diagnosis of osteoporosis," *J Bone Miner Res*, vol. 9, pp. 1137-41, 1994.

[3] M. Neff, R. Radspieler, L. Qin, M. Dambacher, "In vivo and ex vivo bone mineral density and structure measruements using XtremeCT—A high-resolution pQCT (HR-pQCT)," In Leung K S, Qin Y X, Cheung W H, Qin L (eds). *A Practial Manual for Musculosekeltal Research*. World Scientific, pp. 635-48, 2008.

[4] L. Qin, W. Hung, M. Neff, M. Dambacher, R. Radspieler, "Peripheral bone imaging devices and their applications in assessment of bone mineral density, structure and strength, and for prediction of osteoporotic fractures," *Bone* vol. 43, pp. S19-S20, 2008.

[5] L. Vico, M. Zouch, A. Amirouche, D. Frère, N. Laroche, B. Koller, A. Laib, T. Thomas, C. Alexandre, "High-resolution pQCT analysis at the distal radius and tibia discriminates patients with recent wrist and femoral neck fractures," *J Bone Miner Res*, vol. 23, no. 11, pp. 1741-50, 2008.

[6] S. Boutroy, B. Van Rietbergen, E. Sornay-Rendu, F. Munoz, M. Bouxsein, P. Delmas, "Finite element analysis based on in vivo HR-pQCT images of the distal radius is associated with wrist fracture in postmenopausal women". *J Bone Miner Res*, vol. 23, no. 3, pp. 392-9, 2008.

[7] E. Sornay-Rendu, S. Boutroy, F. Munoz, P. Delmas, "Alterations of cortical and trabecular architecture are associated with fractures in postmenopausal women, partially independent of decreased BMD measured by DXA: the OFELY study," *J Bone Miner Res*, vol. 22, no. 3, pp. 425-33, 2007.

[8] D. Black, S. Greenspan, K. Ensrud, L. Palermo, J. McGowan, T. Lang, "The effects of parathyroid hormone and alendronate alone or in combination in postmenopausal osteoporosis," *N Engl J Med*, vol. 349, no. 13, pp. 1207-15, 2003.

[9] S. Boutroy, M. Bouxsein, F. Munoz, P. Delmas, "In vivo assessment of trabecular bone microarchitecture by high-resolution peripheral quantitative computed tomography," *J Clin Endocrinol Metab*, vol. 90, no. 12, pp. 6508-6515, 2005.

[10] S. Khosla, B. Riggs, E. Atkinson, A. Oberg, L. McDaniel, M. Holets, "Effects of sex and age on bone microstructure at the ultradistal radius: a population-based noninvasive in vivo assessment," *J Bone Miner Res*, vol. 21, no. 1, pp. 124-31, 2006.

[11] M. Dambacher, M. Neff, S. Hammerle, R. Rizzoli, P. Delmas, L. Qin, ""XtremeCT" a new dimension in bone micro architecture evaluation in vivo in humans," *Bone*, vol. 36, pp. S324, 2005.

[12] R. Frackowiak, K. Friston, C. Frith, R. Dolan and J. Mazziotta, editors. *Human Brain Function*. Academic Press, USA, 1997.

[13] S. Smith, M. Jenkinson, M. Woolrich, C. Beckmann, T. Behrens, H. Johansen-Berg, P Bannister, et al., "Advances in functional and structural MR image analysis and implementation as FSL," *NeuroImage*, vol. 23, no. (S1), pp. 208-19, 2004.

[14] E. Denton, L. Sonoda, D. Rueckert, S. Rankin, C. Hayes, M. Leach, D. Hill and D. Hawkes, "Comparison and evaluation of rigid and non-rigid registration of breast MR images," *Journal of Computer Assisted Tomography*, vol. 23, pp. 800-5, 1999.

[15] S. Lloyd, "Least squares quantization in PCM," *Special issue on quantization, IEEE Trans. Inform. Theory*, vol. 28, pp. 129-37, 1982.

[16] W. Lorensen and H. Cline, "Marching Cubes: A high resolution 3D surface construction algorithm," *Computer Graphics*, vol. 21, no. 4, 1987.

[17] P. Besl and N. McKay, "A method for registration of 3D shapes," *IEEE Transactions on Pattern Analysis and Machine Intelligence*, vol. 14, pp. 239-56, 1992.

[18] B. K. P. Horn, "Closed-form solution of absolute orientation using unit quaternions," *Journal of the Optical Society of America A*, vol. 4, pp. 629-42, 1987.

[19] E. Meijering, W. Niessen, J. Pluim and M. Viergever, "Quantitative Comparison of Sinc-Approximating Kernels for Medical Image Interpolation," *MICCAI*, pp. 210-7, 1999.

[20] S. K. Boyd, S. Moser, M. Kuhn, R. J. Klinck, P. L. Krauze, R. Müller, and J. Gasser, "Evaluation of Three-dimensional Image Registration Methodologies for In Vivo Micro-computed Tomography", *Annals of Biomedical Engineering*, vol. 34, no. 10, pp. 1587-1599, 2006.

[21] M. A. Dambacher, M. Neff, H. T. Radspieler, P. Rueegsegger, L. Qin, "In vivo bone mineral density and structures in humans: from Instom over Densiscan to XtremCT", In: L. Qin, H. K. Genant, J. Griffith, K. S. Leung (eds). *Advanced Bioimaging Technologies in Assessment of Quality of Bone and Scaffold Biomaterials*, pp. 65-78, Springer Verlag, 2007.

[22] M. Neff, H. R. Radspieler, L. Qin, M. A. Dambacher, "In vivo and in vitro bone mineral density and structure measurements using XteremeCT—A high resolution pQCT (HRpQCT)". In: Leung K S, Qin Y X, Cheung W H, Qin L (eds.) *A Practical Manual for Musculoskeletal Research*, pp. 635-648, World Scientific, 2008.

[23] J. A. MacNeil, S. K. Boyd, "Improved reproducibility of high-resolution peripheral quantitative computed tomography for measurement of bone quality," *Medical engineering & physics*, 30(6), 792-799, 2008

[24] W. Li, J. Kornak, T. Harris, J. Keyak, C. Li, Y Lu, X. Cheng, T. Lang, "Identify fracture-critical regions inside the proximal femur using statistical parametric mapping", *Bone*, 44, 596-602, 2009.

What is claimed is:

1. A method of bone registration of quantitative computed tomography (CT) images, comprising
   acquiring data of a baseline CT scan and a follow-up CT scan of a bone in an individual to produce a baseline image and a follow-up image,
   segmenting bony structures of the baseline image and the follow-up image, respectively, via an approach that can determine thresholds for separating the bony structure from background and non-skeletal tissues, wherein said approach is a double-clustering approach including:
      performing a first K-means clustering on intensities of voxels in each image to separate a foreground from a background, wherein K=2 in said first K-means clustering and the cluster with higher average intensity is considered to be the foreground,
      applying a second K-means clustering on intensities of voxels in foreground regions of each image, wherein K=2 in said second K-means clustering, whereby non-bone structures are removed and clusters with higher average intensity are determined to be bony regions, and optionally
      identifying cortical bone from a segmented bone region as a largest connected component in volume data, and
   registering a bone surface of the follow-up image with a bone surface in the baseline image using a 3D registration algorithm,
   whereby an overlap of the follow-up bone surface and the baseline bone surface is better than that before the registration, wherein, the follow-up bone surface and the baseline bone surface are aligned.

2. The method of claim 1 wherein the 3D registration algorithm is an iterative closest point (ICP).

3. The method of claim 2 wherein a transformation to be solved in the ICP involves a limited degree of freedom (DOF).

4. The method of claim 3 wherein the DOF is 6 degrees of freedom or a rigid transformation.

5. The method of claim 1 wherein a registration error between the baseline and follow-up volumetric data decreases after the registration.

6. The method of claim 5 wherein the registration error is quantified as Normalized Total Absolute Intensity Difference (NTAID) and the NTAID value decreases to no more than about 50%, 40%, 30%, 20%, 10%, 5%, 4%, 3%, 2%, or 1% after the registration.

7. The method of claim 1 further comprising an image down-sampling of image data before the step of bony structure segmentation.

8. The method of claim 7 wherein the image down-sampling is implemented by specifying shrink factors at each level for each dimension.

9. The method of claim 1, wherein the bone is selected from a group consisting of a long bone, a flat bone, a short bone, an irregular bone, and sesamoid bone.

10. The method of claim 1, wherein the individual is a mammal.

11. The method of claim 1, wherein the CT comprises:
    quantitative CT, peripheral quantitative computed tomography (PQCT), micro-CT, High-resolution peripheral quantitative computed tomography (HR-pQCT), Magnetic resonance imaging, or Positron Emission Tomography Computed Tomography (PET-CT).

12. A method of a morphometric comparison in a longitudinal assessment of bone quality in a same individual, comprising
acquiring data of a baseline scan and a follow-up scan of a bone in the individual to produce a baseline image and a follow-up image,
segmenting bony structures of the baseline image and the follow-up image, respectively, via an approach that can determine thresholds for separating the bony structures from background and non-skeletal tissues, wherein said approach is a double-clustering approach including:
performing a first K-means clustering on intensities of voxels in each image to separate a foreground from a background, wherein K=2 in said first K-means clustering and the cluster with higher average intensity is considered to be the foreground,
applying a second K-means clustering on intensities of voxels in foreground regions of each image, wherein K=2 in said second K-means clustering, whereby non-bone structures are removed and clusters with higher average intensity are determined to be bony regions, and optionally
identifying cortical bone from a segmented bone region as a largest connected component in volume data, and
registering a bone surface of the follow-up image with a bone surface in the baseline image using a 3D registration algorithm so that the follow-up bone surface and the baseline bone surface are aligned, and
transforming the follow-up image and additional follow-up images by applying a transformation matrix, which is yielded from the registration, on data of the follow-up images,
whereby the additional follow-up images can be compared with baseline images to determine morphometric difference or change between the baseline images and the follow-up images.

13. The method of claim 12 wherein the 3D registration algorithm is an iterative closest point (ICP).

14. The method of claim 13 wherein the ICP involves a limited degree of freedom (DOF).

15. The method of claim 14 wherein the DOF is 6 degrees of freedom or of a rigid transformation.

16. The method of claim 12 wherein a registration error between the baseline and follow-up volumetric data decreases after the registration.

17. The method of claim 16 wherein the registration error is quantified as the Normalized Total Absolute Intensity Difference (NTAID) and the NTAID value decreases to no more than about 50%, 40%, 30%, 20%, 10%, 5%, 4%, 3%, 2%, or 1% after the registration.

18. The method of claim 12 further comprising an image down-sampling of the data before the step of bony structure segmentation.

19. The method of claim 18 wherein the image down-sampling is implemented by specifying shrink factors at each level for each dimension.

20. The method of claim 12, wherein the bone is selected from a group consisting of a long bone, a flat bone, a short bone, an irregular bone, and sesamoid bone.

21. The method of claim 12, wherein the individual is a mammal.

22. The method of claim 12, wherein said image is of computed tomography (CT), quantitative CT, peripheral quantitative computed tomography (pQCT), micro-CT, High-resolution peripheral quantitative computed tomography (HR-pQCT), Magnetic resonance imaging, or Positron Emission Tomography Computed Tomography (PET-CT).

23. A computed tomography apparatus for a morphometric comparison in a longitudinal assessment of bone quality in a same individual, comprising
a) a scanner for scanning a baseline image and a follow-up image of a bone in the individual
b) a data receptor acquiring data of the baseline image and the follow-up image, and optionally additional one or more baseline images and additional one or more follow-up images,
c) a segmentation processor for segmenting bony structures of the baseline image and the follow-up image, respectively, via an approach that can determine thresholds for separating the bony structures from background and non-skeletal tissues, wherein said approach is a double-clustering approach including:
performing a first K-means clustering on intensities of voxels in each, image to separate a foreground from a background, wherein K=2 in said first K-means clustering and the cluster with higher average intensity is considered to be the foreground,
applying a second K-means clustering on intensities of voxels in foreground regions of each image, wherein, K=2 in said second K-means clustering, whereby non-bone structures are removed and clusters with higher average intensity are determined to be bony regions, and optionally
identifying cortical bone from a segmented bone region as a largest connected component in volume data, and
d) a register for registering a bone surface of the follow-up image with a bone surface in the baseline image using a 3D registration algorithm so that the follow-up bone surface and the baseline bone surface are aligned,
e) a transformation processor for transforming the follow-up image and the additional follow-up images by applying a transformation matrix, which is yielded from a registration and stored in the data receptor, on data of the follow-up images, and
f) an output device for displaying morphometric difference or change between the baseline images and the follow-up images.

* * * * *